(12) United States Patent
Iyengar et al.

(10) Patent No.: US 12,397,803 B2
(45) Date of Patent: Aug. 26, 2025

(54) DETERMINING VEHICLE HEIGHT USING 5G NR SIGNALS

(71) Applicant: INTERNATIONAL BUSINESS MACHINES CORPORATION, Armonk, NY (US)

(72) Inventors: Ashok Kumar Iyengar, Encinitas, CA (US); Krishna Kumar Ramachandran, Cary, NC (US); Sharath Prasad Krishna Prasad, Flower Mound, TX (US); Brandon Curney Jones, Puyallup, WA (US); Sai Srinivas Gorti, Irving, TX (US); Jeric Saez, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 18/191,313

(22) Filed: Mar. 28, 2023

(65) Prior Publication Data
US 2024/0326834 A1    Oct. 3, 2024

(51) Int. Cl.
*B60W 40/12*     (2012.01)
*B60W 50/14*     (2020.01)
(Continued)

(52) U.S. Cl.
CPC ............ *B60W 40/12* (2013.01); *B60W 50/14* (2013.01); *B60W 60/001* (2020.02); *H04W 4/44* (2018.02);
(Continued)

(58) Field of Classification Search
CPC .... B60W 40/12; B60W 60/001; B60W 50/14; B60W 2050/143; B60W 2556/45; H04W 4/44
See application file for complete search history.

(56) References Cited

U.S. PATENT DOCUMENTS 3,768,187 A    10/1973    Dunne
4,284,971 A    8/1981    Lowry
(Continued)

FOREIGN PATENT DOCUMENTS

WO    2018086146 A1    5/2018
WO    2018178844 A1    10/2018

OTHER PUBLICATIONS

IBM: List of IBM Patents or Patent Applications Treated as Related. Filed Herewith. 2 pages.
(Continued)

*Primary Examiner* — Thomas E Worden
*Assistant Examiner* — Jay Khandpur
(74) *Attorney, Agent, or Firm* — Caleb D. Wilkes

(57) ABSTRACT

A method, a computer system, and a computer program product for vehicle height sensing are provided. A 5G NR transceiver of a computer receives a first 5G NR signal indicative of a vehicle approaching the 5G NR transceiver. The computer is fixed to a stationary object. In response to receiving the first 5G NR signal, the computer generates and transmits a second 5G NR signal. The 5G NR transceiver receives a third 5G NR signal in response to the transmitting of the second 5G NR signal. The computer determines a height of the vehicle by performing triangulation using the received third 5G NR signal. In response to the height exceeding a clearance distance of a stationary roadway structure associated with the computer, the computer generates and transmits a first response signal for altering a travel path of the vehicle.

13 Claims, 4 Drawing Sheets

(51) Int. Cl.
    *B60W 60/00*     (2020.01)
    *H04W 4/44*     (2018.01)

(52) U.S. Cl.
    CPC ... *B60W 2050/143* (2013.01); *B60W 2556/45* (2020.02)

(56) References Cited

U.S. PATENT DOCUMENTS

| | | | |
|---|---|---|---|
| 6,690,408 | B1 | 2/2004 | Abersfelder |
| 8,854,462 | B2 | 10/2014 | Herbin |
| 8,880,237 | B2 | 11/2014 | Boss |
| 10,969,595 | B2 | 4/2021 | Uenohara |
| 2012/0139756 | A1* | 6/2012 | Djurkovic ............ G08G 1/095 340/905 |
| 2015/0264627 | A1* | 9/2015 | Perdomo ............. H04L 67/04 370/329 |
| 2016/0379485 | A1 | 12/2016 | Anastassov |
| 2019/0108548 | A1 | 4/2019 | Gaither |
| 2020/0097331 | A1* | 3/2020 | Boehm ............... G06F 9/5061 |
| 2020/0249696 | A1 | 8/2020 | Watanabe |
| 2020/0279481 | A1* | 9/2020 | Kondo ............... G08G 1/0969 |
| 2020/0333745 | A1 | 10/2020 | Gale |
| 2021/0382144 | A1* | 12/2021 | He ...................... G01S 7/003 |
| 2021/0403042 | A1* | 12/2021 | Jaegal ................ B60W 50/14 |
| 2022/0065651 | A1* | 3/2022 | Beaurepaire ......... G06T 11/60 |
| 2022/0171069 | A1 | 6/2022 | Hamilton |

OTHER PUBLICATIONS

Abdallah et al., "SafeOverPass: An Edge-Based Low-Clearance Overpass Warning System," IEEE, 2021 Fourth International Conference on Connected and Autonomous Driving (MetroCAD), conference Apr. 2021, added to IEEE Explore Aug. 2021, pp. 17-22.

Ahamed et al., "5G Network Coverage Planning and Analysis of the Deployment Challenges," Sensors, Published Online: Oct. 3, 2021, PMCID: PMC8512478, https://www.ncbi.nlm.nih.gov/pmc/articles/PMC8512478/, 31 pages.

Author Unknown "Computer vision system helps to prevent tall trucks from hitting bridges" University of Cambridge, Accessed: Jan. 6, 2023, https://www-smartinfrastructure.eng.cam.ac.uk/news-and-events/computer-vision-system-helps-to-prevent-tall-trucks-from-hitting-bridges, 3 pages.

Chacon et al., "A Moving Vehicle Height Monitoring Sensor System for Overheight Impact Avoidance," Infrastructures 2021, 6, 91, Published: Jun. 18, 2021, https://doi.org/10.3390/infrastructures6060091, 10 pages.

Krishna et al., "Intelligent Predictive Sign Boards for Road Safety ", Related U.S. Appl. No. 17/654,961, filed Mar. 15, 2022, 59 pages.

LF Edge, "Micro-Mec", Accessed Mar. 24, 2023, https://www.lfedge.org/projects/release-3/r3micro-mec/, 3 pages.

Noppakaew et al., "Construction of multi-layered QR codes utilizing partitions of positive integers", Journal of Mathematics and Computer Science, 18 (2018), Accepted: Dec. 3, 2017, pp. 306-313, doi: 10.22436/jmcs.018.03.06.

Penn State, "Image-Based Vehicle Height Measurement for Prevention of Low Clearance Infrastructure Collisions," Accessed: Jan. 6, 2023, https://r3utc.psu.edu/research/core-research-projects/image-based-vehicle-height-measurement/, 3 pages.

RF Wireless World, "5G vs 6G | Difference between 5G and 6G," Accessed: Mar. 24, 2023, https://www.rfwireless-world.com/Terminology/Difference-between-5G-and-6G.html, 9 pages.

Scaleout Software, "Digital Twins and Real-Time Digital Twins: What's the Difference?", blogpost on scaleoutsoftware.com, published Oct. 16, 2019, 6 pgs., accessed Mar. 4, 2022 from <https://www.scaleoutsoftware.com/featured/digital-twins-and-real-time-digital-twins-whats-the-difference/>.

Tapco, "Overheight Warning System," Tapconet.com, Accessed: Mar. 24, 2023, https://www.tapconet.com/product/overheight-warning-system, 7 pages.

Tokyo Institute of Technology, "Introducing a transceiver that can tap into the higher frequency bands of 5G networks" Tech Xplore, Jun. 15, 2022, https://techxplore.com/news/2022-06-transceiver-higher-frequency-bands-5g.html, 3 pages.

Tung, "Warning System for Over-Height Vehicles" electronicsforu,com, Jan. 15, 2019, https://www.electronicsforu.com/electronics-projects/vehicle-detection-system, 4 pages.

Web Urbanist, "Liquid Stop Sign: Emergency Laser Projection on Sheet of Water", article on weburbanist.com, published on Nov. 5, 2015, 8 pgs., accessed on Mar. 2, 2022 from <https://weburbanist.com/2015/11/05/liquid-stop-sign-emergency-laser-projection-on-sheet-of-water/>.

Abbas, "5G Ultra-Reliable Low Latency Communication (URLLC)", 5G Hub, Accessed Mar. 28, 2023, https://5ghub.US/5g-ultra-reliable-low-latency-communication-urllc/, 4 pages.

Pride Transport, "How Long Does It Take a Semi-Truck to Stop?", Jan. 13, 2022, https://www.pridetransport.com/news-and-events/how-long-does-it-take-a-semitruck-to-stop, 5 pages.

Mell et al., "The NIST Definition of Cloud Computing", National Institute of Standards and Technology, Special Publication 800-145, Sep. 2011, pp. 1-7.

\* cited by examiner

DETERMINING VEHICLE HEIGHT USING 5G NR SIGNALS

BACKGROUND

The present invention relates generally to communication signal technologies, vehicular travel, smart cities, and software for infrastructure and community protection.

SUMMARY

A method is provided for vehicle height sensing. A 5G NR transceiver of a computer receives a first 5G NR signal indicative of a vehicle approaching the 5G NR transceiver. The computer is fixed to a stationary object. In response to receiving the first 5G NR signal, the computer generates and transmits a second 5G NR signal. The 5G NR transceiver receives a third 5G NR signal in response to the transmitting of the second 5G NR signal. The computer determines a height of the vehicle by performing triangulation using the received third 5G NR signal. In response to the height exceeding a clearance distance of a stationary roadway structure associated with the computer, the computer generates and transmits a first response signal for altering a travel path of the vehicle. A computer system and a computer program product corresponding to this method are also provided herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
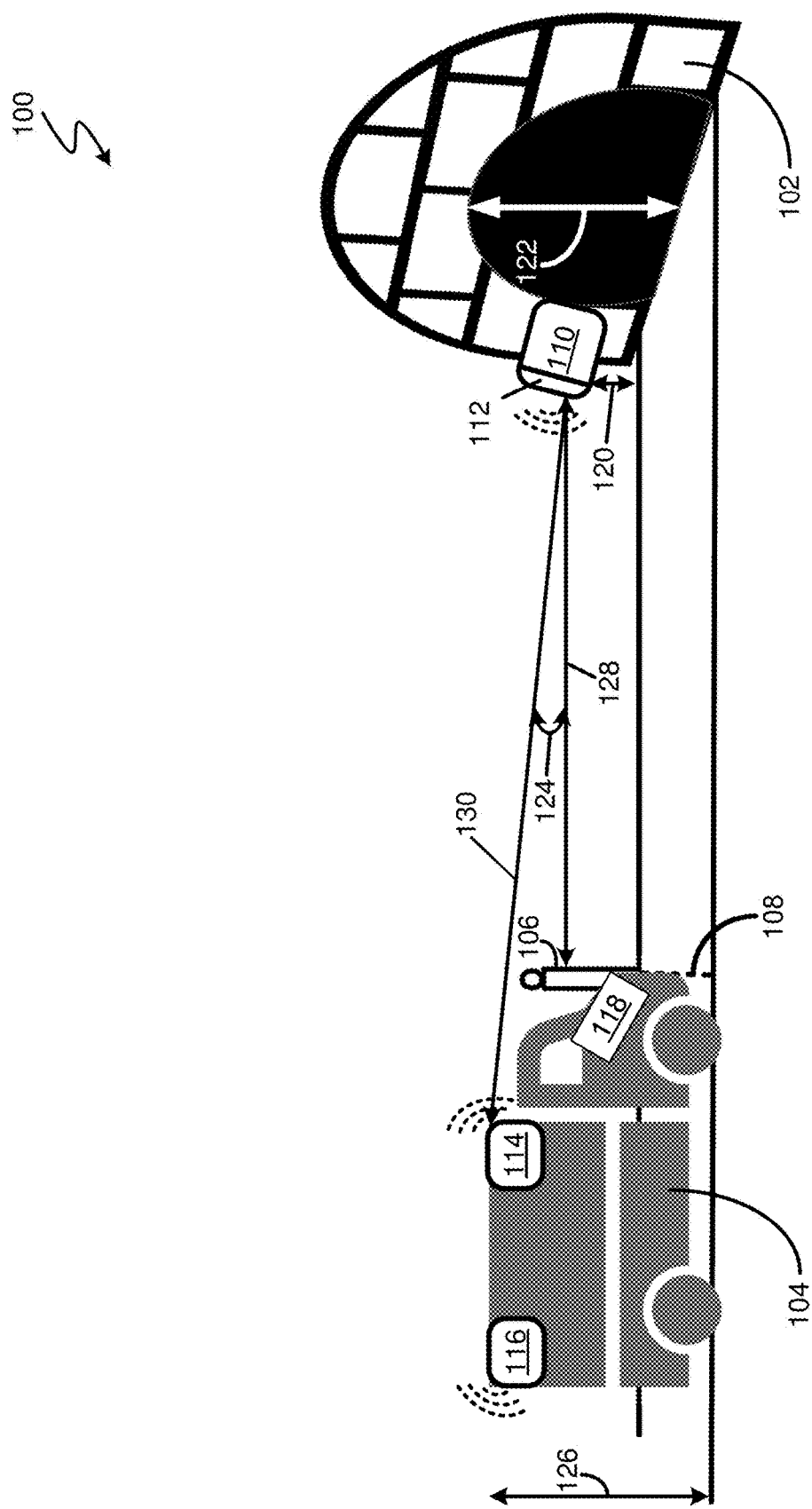
FIG. 1 illustrates a 5G NR vehicle height sensing communication environment according to at least one embodiment for determining a height of a moving vehicle that is approaching a roadway section with a passage area with limited height clearance.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for protecting, in an automated manner, road infrastructure, such as a bridge, from suffering collisions with tall vehicles. Smart city deployments have included cameras and/or other sensors, digital communication systems, and data collection for improving functioning of a city including its traffic flow. The present embodiments use software and/or artificial intelligence to achieve (1) an automated sensing of danger when a vehicle that is too tall approaches a bridge with a limited height clearance for vehicles passing underneath an overhang and (2) automated response generation for preventing the possible collision that may occur. The present embodiments harness 5G cell technology to provide an improved system for sensing a potential vehicle-bridge collision and for generating a warning signal and/or a mitigation signal for helping prevent the collision.

In at least some of the present embodiments, a vehicle with an edge device approaches a bridge. In this disclosure, the reference to a "computer" may in each instance refer to "an edge device". An edge device may include hardware that provides an entry point into enterprise or service provider core networks. The vehicle may be a high profile vehicle such as a truck. The vehicle may be equipped with a respective 5G transceiver at its highest point(s), e.g., at a front and rear of a cargo-carrying area of the vehicle. The bridge has its own edge device that may be disposed at a street-level of the bridge. When the vehicle reaches a road marker which has its own edge device with a 5G transceiver including a 5G transmitter, either the edge device of the vehicle or the edge device of the road marker sends a 5G NR signal to the 5G transceiver on the edge device of the bridge. The edge device on the bridge has a vehicle height sensing software program that includes a pre-set bridge height. In response to being notified of the presence of the approaching vehicle, the vehicle height sensing software program determines a height of the approaching vehicle using 5G signal measurement and geometrical techniques such as triangulation.

If the height of the vehicle is more than the maximum passage clearance height of the bridge, the 5G transceiver edge device at the bridge sends a warning signal to the 5G transceiver edge device at the vehicle. The edge device on the vehicle may be linked to the Human Machine Interface (HMI) in the vehicle. The warning signal causes the vehicle to emit a loud sound/warning message that may include a visual heads-up display on any navigation computer display screen of the HMI in the vehicle in order to alert the driver to stop. Autonomous vehicles would receive such notifications on a pre-determined frequency and the signal may cause the autonomous vehicle to initiate a braking action.

In at least some embodiments, one or more transceivers on the vehicle are linked to the HMI and the electronic control unit (ECU) in the vehicle and to a mobile computer (e.g., cell phone and/or smart watch) of the driver. The mobile computer may function as an auxiliary device for helping warn the driver. These devices may participate in the transportation and safety network on a pre-determined frequency.

The present embodiments combine various features such as 5G cell technology, microMEC (μMEC), 5G NR transceivers, mobile devices, and audio-enabled HMI on-board a vehicle to work together to create a dynamic height sensing system that can warn drivers and/or notify autonomous high profile moving vehicles and be integrated with existing infrastructure such as bridges. The present embodiments take advantage of low latency and high bandwidth offered in 5G cell technology and are easily incorporated into smart city infrastructure and transportation and safety networks. The present embodiments achieve advantages in providing communication and automation for collision/accident prevention against structures with lower height clearances.

By harnessing 5G cell technology and in particular 5G NR (New Radio) cell technology that uses high frequency millimeter wave (mm Wave) bands, communication and localization advantages are achieved with the present embodiments for protecting community infrastructure and vehicles. By using 5G NR//mmWave, the height of an approaching vehicle may be determined and a communication message for a vehicle driver and/or for an autonomous vehicle may be generated. These embodiments enhance a transportation safety network in order to prevent collision/accident in a time-effective manner.

5G New Radio Communication achieves an effective combination of communication advantages of high-bandwidth and low latency communication. 5G NR is equipped to fulfill time-critical communication needs. 5G NR guarantees low latency with high reliability. For the mmWave spectrum, the duration of a schedulable transmission slot (i.e., the time granularity) can be as little as 0.125 milliseconds (ms). In addition, the encoding and decoding of the transmissions in 5G NR can be as fast as a fraction of the actual slot duration. For alignment delays (i.e., the time from when data becomes available until next transmission slot starts), the 5G NR standard allows for sub-dividing a slot further into sub-slots. For instance, with seven sub-slots, the wait duration with 5G NR would be shortened from 0.125 ms to about 0.02 ms for mm Wave.

5G New Radio Communication also achieves localization advantages by providing quasi-optical transmissions and high-bandwidth, high frequency transmissions. The quasi-optical nature of mm Wave radio frequency signals of 5G NR and the large bandwidth at high frequencies enable precise localization or positioning of an object such as a vehicle that is approaching road infrastructure which limits roadway size. The quasi-optical nature of a 5G NR transmission results in sharp, narrow beam width signals with low scattering upon reflections. These narrow beams help gather accurate angle information such as angle of arrival (AoA), angle of departure (AoD), and the received signal strength information (RSSI). The large bandwidth available at high frequencies for 5G NR enables high-resolution time measurements such as time of arrival (ToA) or time difference of arrival (TDoA) at the transceiver which is a transmitter/receiver device. Once these parameters are available, the present embodiments achieve localization that includes a height determination that for example may be carried out using triangulation based on geometric principles.

While 5G NR (New Radio) technology exists today, 5G NR will continue to evolve over time to allow better data transmission rates over the frequencies used by mobile carriers. The standards for both NR and OFDM (orthogonal frequency division multiplexing) as a modulation format are clearly established as the method for using multiple streams to increase data transmission rates. OFDM having been in use since 4G continues to be the method that the 3GPP body has laid out as the standard for multiplexing. Narrow interband frequencies will continue to be utilized as the need for fully utilized data over the available spectrum will be optimized.

Due to the universal nature of the 3GPP standards that govern all mobile communication standards the boundaries and requirements of how the 3GPP standards are used as a communication standard are clearly defined. With that in mind the standards today will be compatible with the evolution of 6G in the future. Due to the continued compatibility around new standards the present embodiments will continue to work with and be applicable to 6G future evolutions. Thus, the references to 5G herein may be interpreted as encompassing 6G signals which build upon and are compatible with 5G standards.

By combining multiple 5G NR transceivers together in one communication system, a micro-cell and/or a micro-MEC (multi-access edge computing) are created in traffic areas around bridges and/or underpasses that are prone to accidents. The micro-cell and/or micro-MEC may also incorporate Ultra-Reliable and Low-Latency Communications (URLLC) of a 5G network that are used by autonomous vehicles. URLLC or ultra-reliable low-latency communication provides the high network reliability and extremely low latency requirements of a mission-critical application such as the vehicle height detection system intended for preventing an imminent accident from happening. URLLC provides 99.999% network reliability and approximately 1 millisecond data transmissions required for communication between the edge device and the vehicle/driver of the vehicle. The micro-cell and/or micro-MEC may be integrated with Smart City control software that has additional safety features and resource organizing functions.

In network topology, micro-MEC nodes reside on the far edge and/or at the ultra-far edge. Physically for the present embodiments the micro-MEC nodes (sometimes referred to as μMECs) may be typically installed on light poles, buildings, bridges, or on moving vehicles. Using a micro-MEC enables new functionalities and models on the network edge. Better latencies for end users are achieved because more data can be processed locally. Better security and privacy can be achieved, because sensitive data need not be transferred to a centralized location. New emerging services seek to further push the concept of micro-MEC to user environments for localized, private, and quicker processing of information.

Figure 4:
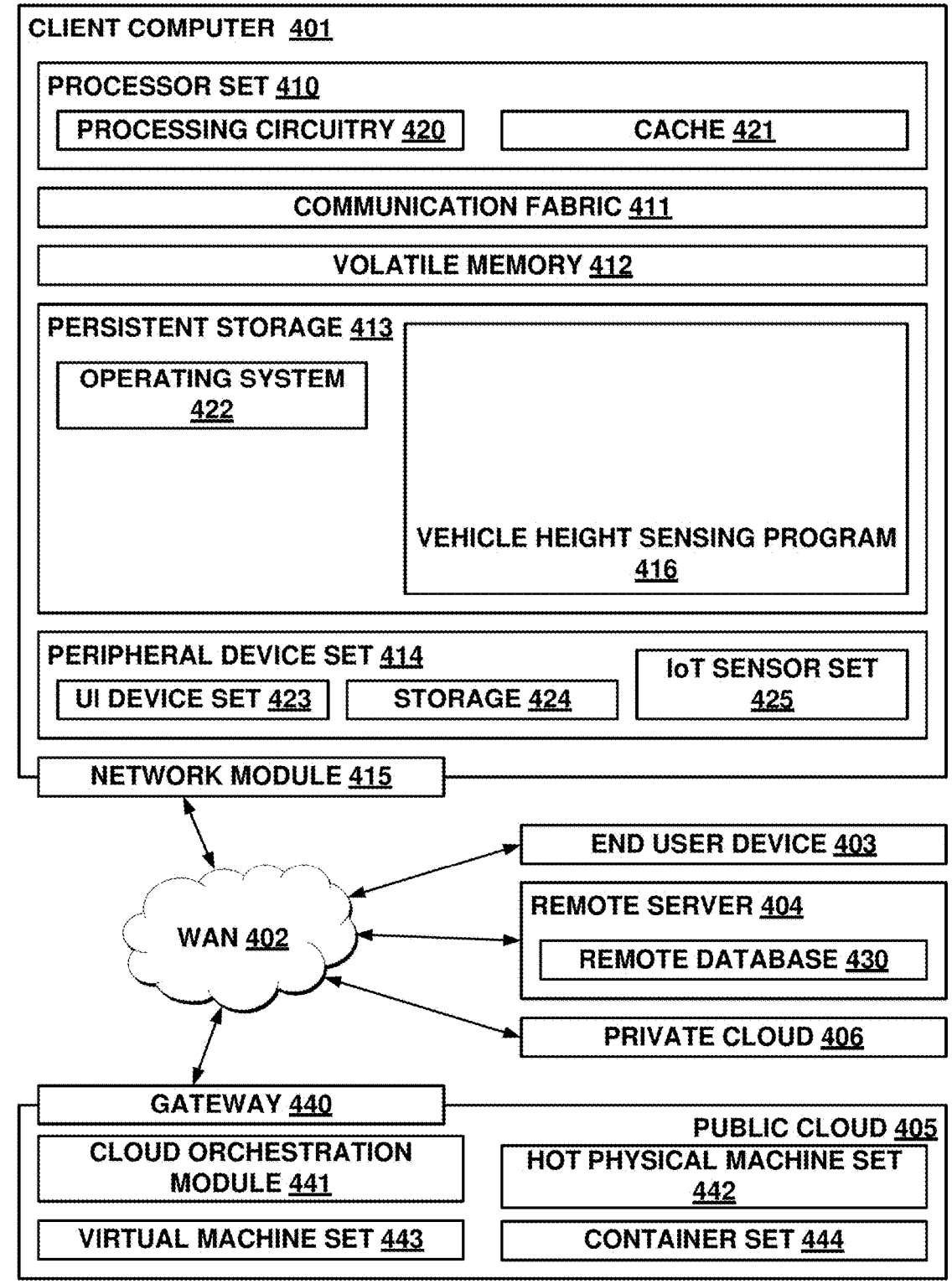
FIG. 4 is a block diagram illustrating a computer environment with multiple computer systems in which the vehicle height sensing and warning process described for FIG. 3 may be carried out.

FIG. 1 illustrates a vehicle height sensing environment 100 for protecting tall vehicles from colliding with overhead portions of height-limiting roadway infrastructure such as a bridge. A protection computer 110 that includes a 5G NR main transceiver 112 is fixed to a bridge 102 which has an opening into a roadway segment. To pass through the opening, a vehicle such as the approaching vehicle 104 must pass underneath an overhang of the bridge 102. Bridge overhang height 122 in FIG. 1 shows the height from the roadway ground level up to the bottom of the bridge overhang. A vehicle must have a height that is smaller than the bridge overhang height 122 in order to be able to pass through the opening and enter the roadway segment on the bridge or tunnel. The protection computer 110 may communicate with other computers and/or 5G transceivers within the vehicle height sensing environment 100 in order to check the height of approaching vehicles and generate appropriate responses when an approaching vehicle is too tall for successfully and/or safely passing through the opening of the bridge 102. The main transceiver 112 is configured to receive 5G NR signals from other 5G NR transceivers in the vehicle sensing environment 100 and to transmit 5G NR signals to other 5G transceivers in the vehicle sensing environment 100. The protection computer 110 may be equivalent and/or equal to the client computer 401 that is shown in FIG. 4 and that includes vehicle height sensing program 416.

FIG. 1 shows that an approaching vehicle 104 includes one or more 5G NR transceivers such as the lead transceiver 114 and a rear transceiver 116. In at least some embodiments the lead transceiver 114 and/or the rear transceiver 116 are disposed at or adjacent a highest surface of the approaching vehicle 104 so as to assist in geometrical calculations that will be performed by the protection computer 110. The lead transceiver 114, the rear transceiver 116, and the main transceiver 112 of the protection computer 110 are each configured to transmit and receive 5G NR communication signals which contain data and/or information.

In a triangulation embodiment, the protection computer 110 determines a height of an approaching vehicle by using the 5G NR signals to perform a geometrical triangulation calculation with respect to a highest point of the approaching vehicle 104. The position of the lead transceiver 114 on the approaching vehicle 104 indicates the highest point of the approaching vehicle 104 and may be sensed/determined via the vehicle height sensing program 416 that uses the main transceiver 112.

A road marker 106 is positioned at a known length distance 128 from the protection computer 110. A road line 108 which passes perpendicular through the roadway is aligned with the road marker 106 so that when the approaching vehicle passes through the road line 108 the front of the approaching vehicle 104 is known to be the specified length distance 128 from the protection computer 110.

The protection computer 110 may generate and transmit a 5G NR communication signal 130 at an upward angle from the protection computer 110. When this transmitted signal 130 is received by the lead transceiver 114, the protection computer 110 may use the positioning of its transceiver transmitter to determine a signal angle 124. The lead transceiver 114 may generate a return 5G NR signal that travels back to the protection computer 110 to inform the protection computer 110 that the signal transmitted by the protection computer 110 was received. A vehicle height sensing program 416 of the protection computer 110 may perform a triangulation calculation using the specific length distance 128, the signal angle 124, and a main transceiver height 120 to determine a vehicle height 126 of the approaching vehicle 104.

Using the geometric formula for a right triangle, the vehicle height 126 may be determined via triangulation by using the formula:

(length distance 128 ∗ tangent of signal angle 124) + the main transceiver height 120 = vehicle height

The vehicle height sensing program 416 of the protection computer 110 may perform this triangulation calculation to determine the vehicle height 126.

In at least some embodiments, the road marker 106 itself has a road marker 5G transceiver which can communicate with the transceivers of the approaching vehicle 104 and/or with the transceiver 112 of the protection computer 110. An initiation signal to the main protection computer 110 for initiating the 5G signal transmission for a vehicle height measurement may be from the road marker transceiver and/or from the transceiver 114 on the approaching vehicle 104. The roadway marker transceiver may be programmed to transmit a notification signal to the main protection computer any time an approaching vehicle is sensed.

In at least some embodiments, the protection computer 110 has the bridge overhang height 122 stored within internal computer memory of the protection computer 110. The protection computer 110 may have the bridge overhang height 122 entered manually via a user who uses an input/output device of the protection computer 110. The protection computer 110 may receive the bridge overhang height 122 from a data transmission such as via a wide-area network from a data server. The protection computer 110 may itself include a camera and may use the camera and/or the main transceiver 112 to measure and determine the bridge overhang height 122.

In at least some embodiments, a location of the road marker is selected to provide a sufficient stopping distance for an approaching vehicle to stop before reaching the size-limited roadway stretch such as the bridge overhang if the stopping is initiated at the road marker position. This location/distance may be determined using typical high speeds that are used for the road and based on large vehicles which will have the most difficulty in stopping. Exceeding the calculated maximum length needed may further enhance the safety aspects. In one embodiment, a road marker would be placed at a minimum distance of 600 feet from the bridge. A fully loaded semi-truck may weigh up to 80,000 pounds. In other instances, trucks may weight roughly 25,000 or 35,000 pounds. A fully loaded semi-truck traveling at 65 miles per hour would need a stopping distance of about 525 feet. By placing the road marker at a position of 600 feet ahead of the main protection computer, a 5G NR notification signal to the main protection computer would travel a distance of 600 feet or greater.

In some instances, the road marker 106 includes fluorescent colors so that the visual attention of drivers is captured to help remind the drivers to keep the vehicle on the road.

The vehicle height sensing program 416 may access the stored value of the bridge overhang height 122 and use a comparator of the vehicle height sensing program 416 to compare that value to the vehicle height 126. If the vehicle height 126 is smaller than the bridge overhang height 122, then the protection computer 110 does not need to perform additional calculations or to generate any warnings regarding the approaching vehicle 104. If the vehicle height 126 is equal to or larger than the bridge overhang height 122, then the protection computer 110 generates additional response signals which may cause an audible speaker associated with the approaching vehicle 104 to play a warning and/or may cause the approaching vehicle 104 to make a course change. In some instance, the approaching vehicle 104 is a self-driving car and the response signal from the protection computer 110 is received via a human machine interface 118 of the self-driving car and causes the self-driving vehicle to performing braking. This braking can help the approaching vehicle 104 stop before the vehicle 104 reaches the bridge 102 and collides with the bridge overhang.

Besides communicating with the other 5G NR transceivers to perform vehicle height determination, the protection computer 110 may via a wide area communication network transmit messages to other computers and/or servers and to receive messages from other computers and/or servers. The vehicle height sensing environment 100 may include many computers and many transceivers including others not shown in the environment 100 of FIG. 1. A wide area network allows digital communication between the various computers and transceivers. The communication network, in addition to the 5G NR communication, may include various types of communication networks, such as the Internet, a wide area network (WAN), a local area network (LAN), a telecommunication network, a wireless network, a public switched telephone network (PTSN) and/or a satellite network. Such communication network may include connections, such as wire, wireless communication links, or fiber optic cables. Such communication network may in some embodiments be equivalent to the wide area network 402 shown in FIG. 4 and subsequently described in this present disclosure.

Figure 2:
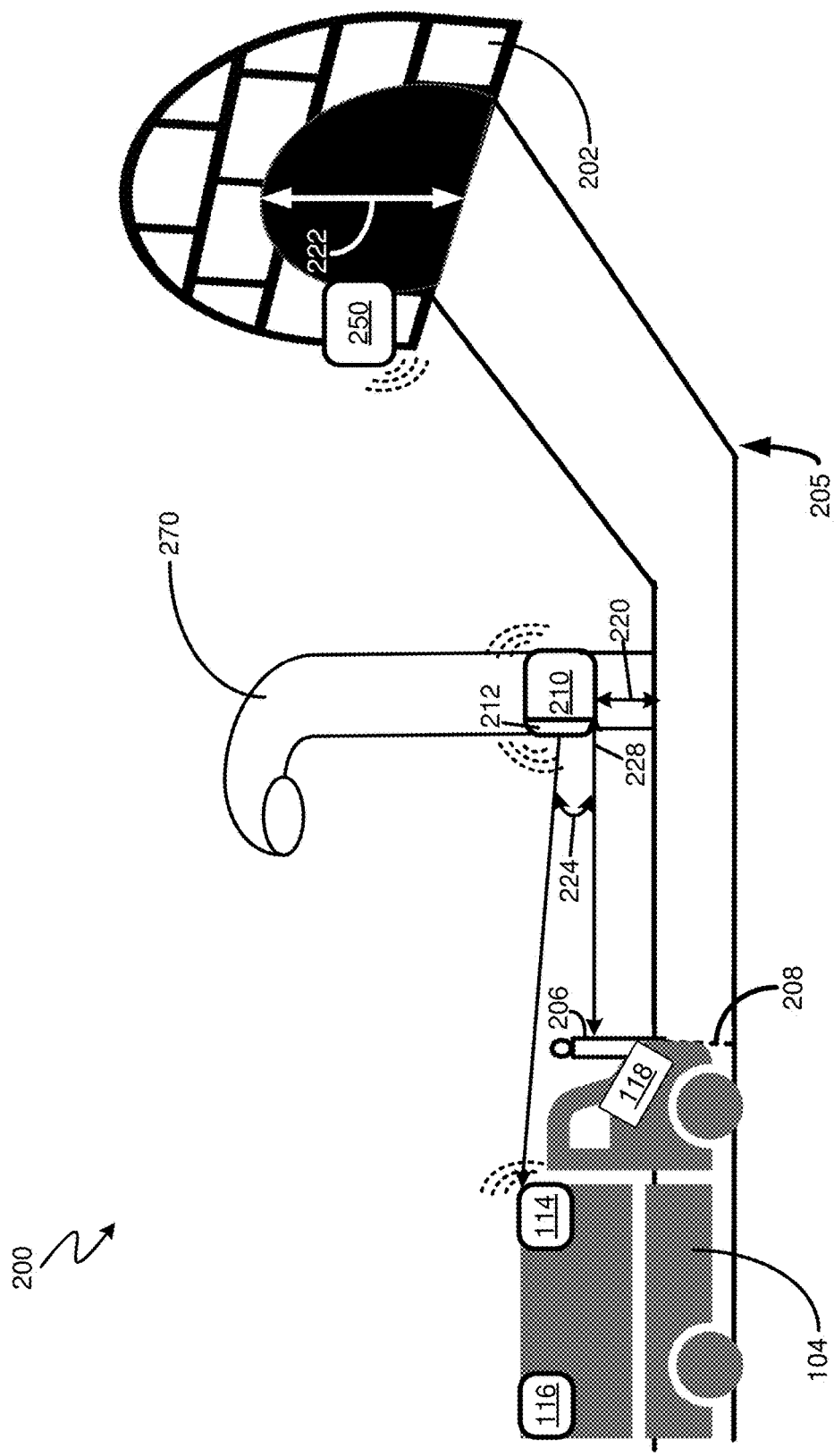
FIG. 2 illustrates an alternative 5G NR communication environment according to at least one embodiment for determining a height of a moving vehicle that is approaching a roadway section passage area with limited height clearance.

FIG. 2 illustrates a vehicle height sensing alternative environment 200 which includes some similar features and components as the vehicle height sensing alternative environment 100 shown in FIG. 1. Different from the vehicle height sensing environment 100 shown in FIG. 1, the vehicle height sensing alternative environment 200 includes an obstruction in the road section that is in the immediate vicinity of the second bridge 202. This obstruction may interfere with a triangulation measurement that would be performed if the protection computer with the main transceiver is disposed at and/or adjacent the opening of the restricted-space roadway infrastructure such as second bridge 202 with its limited height allowance 222. In the embodiment shown in FIG. 2, the obstruction is a roadway bend 205 which interferes with a straight line distance between a usual warning or roadway marker position and the beginning of the opening of the second bridge 202. Other obstructions may include a hill and/or a building in the intervening space.

Due to this obstruction, in this alternative environment 200 the second bridge protection computer 210 with its second main transceiver 212 are disposed away from the second bridge 202. In the depicted example, the second bridge protection computer 210 is disposed past the roadway bend 205 and is fixed to the stationary object of a lamppost 270. The second main transceiver 212 communicates with the lead transceiver 114 of an approaching vehicle similar to how the main transceiver 112 shown in FIG. 1 performed such communication. Other embodiments may include other stable infrastructure such as a traffic light or other road signage for holding the second bridge protection computer 210. The second main protection computer 210 may also communicate with a transceiver of the second roadway marker 206 for initiating of the vehicle height measurement.

Like with the environment 100 shown in FIG. 1, in the alternative environment 200 the vehicle height sensing program 416 on the second bridge protection computer 210 may use the geometric formula for a right triangle to perform triangulation to determine height of an approaching vehicle 104:

The vehicle height sensing program 416 of the second main protection computer 210 may perform this triangulation calculation to determine the height of the approaching vehicle 104. The alternative length distance 228 may be a distance between the second main protection computer 210 and the alternative roadway marker 206 and/or an alternative road line 208 that runs through the road perpendicular to the alternative roadway marker 206.

The second main protection computer 210 may communicate with a second bridge computer 250 disposed at and/or adjacent the second bridge 202. The second bridge computer 250 may determine and/or measure the second bridge height allowance 222 and transmit this value to the second main protection computer 210 so that the second main protection computer 210 may compare that value with the value of the determined height of an approaching vehicle.

Like in the environment 100, the second main protection computer 210 may generate responses and response signals in response to a determination that an approaching vehicle has a height that is equal to or exceeds the second bridge height allowance 222. The vehicle height sensing program 416 of the second main protection computer 210 may generate any of the responses, response signals, and response types that were described above that the main protection computer 110 could generate.

In some instances when non-linear roads are involved, triangulation with curvature equalization may be performed via the main protection computer to generate a topographical map of the non-linear road environment. Such a topographical map may be generated by the main protection computer using its transceiver in a preliminary stage. Then the topographical map is subsequently used to appropriately adjust the calculation of vehicle height when the main protection computer sends a signal that is received by the vehicle transceiver. Because the locations of the cameras/computers/transceivers are known, the program 416 deployed to the edge devices would be tailored to suit the geography of that location.

In at least some embodiments, the various 5G NR transceivers operate at a frequency within a range of 24 GHz to 300 GHz. The 5G NR signals received by and transmitted between the receivers will thus have the frequency within this range. By using these frequencies in the high frequency millimeter wave (mmWave) bands, communication and localization advantages are achieved. The duration of a schedulable transmission slot (i.e., the time granularity) can be as short as 0.125 ms. In addition, the encoding and decoding of the transmissions in 5G NR can be as fast as a fraction of the actual slot duration. For alignment delays (i.e., the time from when data becomes available until next transmission slot starts), the 5G NR standard allows for sub-dividing a slot further into sub-slots. For instance, with seven sub-slots, the wait duration with 5G NR would be shortened from 0.125 ms to about 0.02 ms for mm Wave frequencies. The quasi-optical nature of mmWave radio frequency signals which results in narrow beams helps provide accurate angle of arrival (AoA) and angle of departure (AoD) which can be used to triangulate and determine the height of a vehicle.

(alternative length distance 228 * tangent of alternative signal angle 224) + second main transceiver height 220 = vehicle height.

The vehicle height sensing program 416 may via an edge management program be deployed to the bridge protection computers that together with their 5G NR transceivers constitute the micro-cell or micro-MEC. IBM® Edge Application Manager is an example of such an edge management program capable of deploying and managing the vehicle height sensing program to be used in the infrastructure micro-cell or micro-MEC. By implementing the present embodiments with edge computing, processing speed advantages are achieved. Edge computing is a distributed computing framework that helps bring enterprise applications closer to data sources such as Internet of Things (IoT) devices, edge servers and gateways. This proximity to data at the data source provides advantages of allowing processing and analysis to be done in near real-time to create faster insights, improved response times, bandwidth optimization, and reduction of network traffic. The present embodiments may take advantage of existing and future 5G infrastructure and its increase of bandwidth, latency, and scaling of applications requiring large amounts of real-time data.

A computer system with the vehicle height sensing program operates as a special purpose computer system in which a vehicle height sensing program assists in the protection of a limited-size roadway infrastructure such as a bridge. In particular, the vehicle height sensing program transforms a computer system into a special purpose computer system as compared to currently available general computer systems that do not have the automated vehicle height sensing program.

The main protection computer 110 being disposed on and/or adjacent structure of the bridge 102 and the second main protection computer 210 being disposed on and/or adjacent the lamppost 270 are examples of the present embodiments being easily integrated with existing infrastructure by a roadway.

It should be appreciated that FIGS. 1 and 2 provide only illustrations of some environments or implementations and do not imply any limitations with regard to the environments in which different embodiments may be implemented. Many modifications to the depicted environments may be made based on design and implementation requirements.

Figure 3:
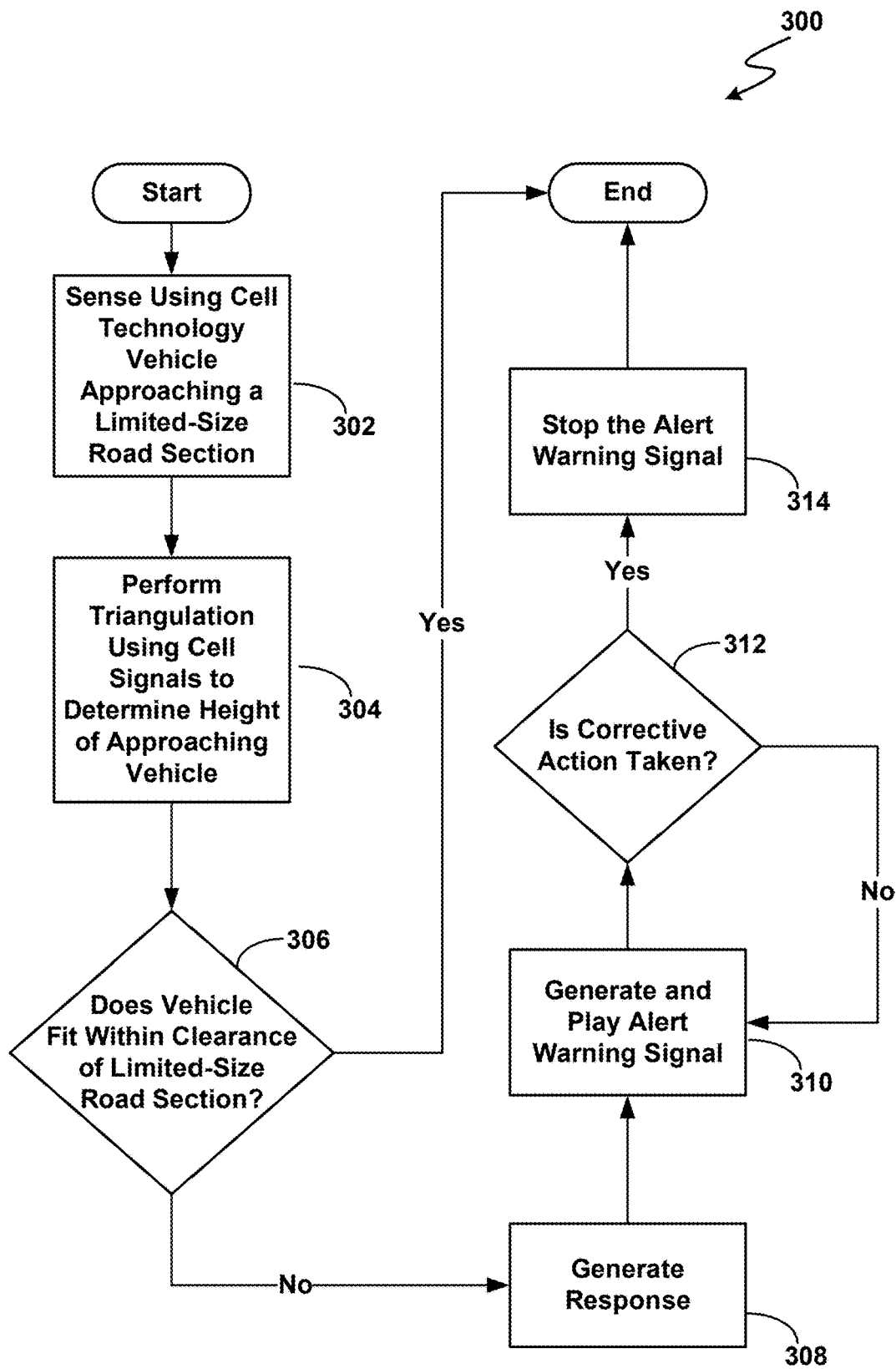
FIG. 3 is an operational flowchart illustrating a vehicle height sensing and warning process according to at least one embodiment which may, for example, be carried out in the 5G NR communication environment shown in FIG. 1 and/or in the alternative 5G NR communication environment shown in FIG. 2.

FIG. 3 is an operational flowchart illustrating a 5G-based vehicle height sensing process 300 according to at least one embodiment. This 5G-based vehicle height sensing process 300 may be implemented using one or more portions of a vehicle height sensing program 416 shown in FIG. 4 and described subsequently and using the micro-cell/micro-MEC including one or more of the computers and transceivers shown in FIGS. 1 and 2. The vehicle height sensing program 416 may include and/or access various modules, user interfaces, services, machine learning models, public information about vehicles and vehicle size, and public information about roadway infrastructure updates and may use data storage when performing the 5G-based vehicle height sensing process 300. The 5G-based vehicle height sensing process 300 helps sense and respond to danger when an approaching vehicle is too tall to fit underneath an overhang of a bridge without colliding with same.

In a step 302 of the 5G-based vehicle height sensing process 300, a vehicle approaching a limited-size road section is sensed using cell technology. In at least some embodiments, step 302 is performed via a 5G NR transceiver affixed to an approaching vehicle generating a signal which is transmitted to and received by a 5G NR transceiver of a computer which hosts the vehicle height sensing program 416. Such computer may be the main protection computer 110 shown in FIG. 1 or the second main protection computer 210 shown in FIG. 2. In some instances, this initial signal from the transceiver attached to the vehicle may be considered a first 5G NR signal. In some embodiments, step 302 occurs with the 5G NR main transceiver associated with the main protection computer receiving a response signal from a probing 5G NR signal that was initially sent by the 5G NR main transceiver. A vehicle transceiver may receive the probing signal and, in response, send a response signal back to the main transceiver. The main transceiver may repeatedly and consistently send such probing signals in order to be ready to measure oncoming vehicles. In other embodiments, the vehicle transceiver such as the lead transceiver 114 and/or the rear transceiver 116 shown in FIG. 1 repeatedly and consistently send probing signals which are received by the main transceiver as a first signal. In some instances, step 302 occurs due to a signal from a transceiver fixed to an object such as a roadway marker that is away from the bridge. This transceiver may sense an oncoming vehicle and in response generate a 5G NR signal that travels to the main transceiver.

In a step 304 of the 5G-based vehicle height sensing process 300, triangulation is performed using cell signals to determine a height of an approaching vehicle. Triangulation was described above for the environment shown in FIG. 1 and the alternative environment 200 shown in FIG. 2. In response to receiving a first 5G NR signal, the computer with the vehicle height sensing program 416 may generate and transmit a second 5G NR signal which helps determine the sensing angle of a transmission at which the transceiver at the top of the approaching vehicle is hit. Using this sensing angle such as the angles 124, 224 shown in FIGS. 1 and 2, respectively, the vehicle sensing program may perform triangulation to determine the height of the approaching vehicle. Thus, step 304 may be performed in response to step 302 occurring. The above-mentioned triangulation formula may be used to perform step 304.

In a step 306 of the 5G-based vehicle height sensing process 300, a determination is made whether the vehicle fits within the clearance of the limited-size road section. If the determination of step 306 is affirmative and the vehicle is determined to be able to pass through the limited-size road section safely and successfully, e.g., pass under the overhang of a bridge without colliding with the overhang, then the 5G-based vehicle height sensing process 300 proceeds to the end of the process. The 5G-based vehicle height sensing process 300 may be repeated anew when another vehicle is sensed as approaching the limited-size road section. If the determination of step 306 is negative and the determination indicates that the vehicle will not fit within the clearance of the limited-size road section, then the 5G-based vehicle height sensing process 300 proceeds to step 308.

Step 306 may be performed via a comparator of the vehicle height sensing program 416 at the main protection computer 110, 210. A stored value of the clearance such as the bridge overhang height 122 may be stored at the main protection computer 110, 210 and accessed for the comparison. This stored value may be compared to the vehicle height that was determined in step 304. In at least some embodiments, the protection computer 110, 210 has the bridge overhang height 122 stored within internal computer memory of the protection computer 110, 210. The protection computer 110, 210 may have the bridge overhang height 122, 222 entered manually via an input/output device of the protection computer 110 210. The protection computer 110, 210 may receive the bridge overhang height 122, 222 from a data transmission such as via a wide-area network from a data server. The protection computer 110, 210 may itself include a camera and may use the camera and/or the main transceiver 112 to measure and determine the bridge overhang height 122, 222.

In a step 308 of the 5G-based vehicle height sensing process 300, a response is generated via a computer. This computer may be the computer at which the sensing of step 304, the determination of step 306, and/or the calculation of step 304 were performed. Thus, the various steps may be performed via software at a single computer. This computer is an edge computer that is part of a micro-cell/micro-MEC. For example, the protection computer 110 shown in FIG. 1 may generate response signals which cause an audible speaker associated with the approaching vehicle 104 to play a warning and/or cause the approaching vehicle 104 to make a course change. In some instance, the approaching vehicle 104 is a self-driving car and the response signal from the protection computer 110 is received via a human machine interface 118 of the approaching vehicle 104 and causes the self-driving vehicle to performing braking to stop the approaching vehicle 104 before the vehicle 104 reaches the bridge 102. In some instances, the response signal causes the approaching self-driving vehicle to take another route which avoids the limited-height clearance road section.

In a step 310 of the 5G-based vehicle height sensing process 300, an alert warning signal is generated and played. A response signal generated via the main protection computer may be received by one or more receivers on the approaching vehicle. This response signal may include instructions that instruct the computer components of the vehicle to have an audible speaker that is part of a vehicle sound system and/or otherwise associated with the vehicle play a loud warning noise and/or message to alert the user of the approaching danger. In some embodiments, the alert warning signal is a loud sound. In other embodiments the alert warning signal may additionally and/or alternatively include word-based messaging that instructs the user to brake and stop the vehicle or to alter the direction of the vehicle and choose an alternative route. In some embodiments, the word-based messaging may include instructions for taking the vehicle on an exit to avoid the limited-spaced roadway infrastructure. In some embodiments, a computer, such as a cell phone or a smart watch that is within the vehicle and paired with the computer of the vehicle, may receive an instruction to audibly play with the speaker of the computer, e.g., cell phone, the warning noise and/or message. approaching vehicle 104 to play a warning.

In a step 312 of the 5G-based vehicle height sensing process 300, a determination is made as to whether corrective action for the approaching vehicle is taken. If the determination of step 312 is affirmative and the corrective action has been taken, then the 5G-based vehicle height sensing process 300 proceeds to the end of the process. The process may be repeated when another vehicle is sensed as approaching the limited-size road section If the determination of step 312 is negative and the determination indicates that no corrective action has been taken, then the 5G-based vehicle height sensing process 300 proceeds back to step 310 for a continuation of the playing of the alert warning signal until the corrective action is taken. Thus, steps 310 and 312 constitute a loop which is not exited until corrective action is taken.

In some embodiments, the determination of step 312 may be performed using a machine learning model which receives sensor data as input and as output gives a determination as to whether corrective action has taken place. In some instances, the main computer may begin to track movement such as speed and/or direction of the approaching vehicle to determine whether a corrective action has been taken. The main edge computer may make an observation connection with the approaching vehicle either with the 5G NR transceiver attached to the approaching vehicle and/or other tracking such as satellite-based tracking. Using this observation connection and the so-gleaned information about the vehicle current speed, acceleration/deceleration, and/or direction, the machine learning model may perform calculations to predict the travel path of the vehicle and determine whether the current travel path still coincides with the restricted-size area.

Such a machine learning model may include naive Bayes models, random decision tree models, linear statistical query models, logistic regression n models, neural network models, e.g. convolutional neural networks, multi-layer perceptrons, residual networks, long short-term memory architectures, algorithms, deep learning models, deep learning generative models, and other models. Training data includes samples of vehicle traveling information and a destination. The learning algorithm, in training the machine learning models in question, finds patterns in input data about the bridge avoidance in order to map the input data attributes to the target. The trained machine learning models contain or otherwise utilize these patterns so that the recommendations and recognition can be predicted for similar future inputs. A machine learning model may be used to obtain predictions on new vehicle travel paths and a bridge with limited clearance size. The machine learning model uses the patterns that are identified to determine what the appropriate recognition and generation decisions are for future data to be received and analyzed. As samples are being provided, training of the one or more machine learning models may include supervised learning by submitting prior data sets to an untrained or previously trained machine learning model. In some instances, unsupervised and/or semi-supervised learning for the one or more machine learning models may also be implemented.

In some embodiments, the main edge computer may use navigational software with GPS tracking of a vehicle to make the determination of step 312.

In a step 314 of the 5G-based vehicle height sensing process 300, the alert warning signal is stopped. The main computer may generate and transmit a termination signal which is received by the approaching vehicle and which causes the audible speaker to cease playing the alert warning signal.

It may be appreciated that FIG. 3 provides illustrations of some embodiments and does not imply any limitations with regard to how different embodiments may be implemented. Many modifications to the depicted embodiment(s), e.g. to a depicted sequence of steps, may be made based on design and implementation requirements.

In at least some embodiments, the infrastructure edge device constantly sends 5G NR signals as requests looking for high profile vehicles. When from the searching signals the edge device receives a successful confirmation of an approaching high profile vehicle, the vehicle height sensing program 416 automatically triggers the height measuring actions including the generation of a vehicle height measuring 5G NR signal transmission. An edge device on a high profile vehicle in some embodiments is linked to Human Machine Interface in the vehicle. The Human Machine Interface may be programmed to emit a loud warning sound, generate a visual a heads-up display message, and/or cause a mobile device of the driver or other vehicle passenger to beep in order to alert the driver to stop. Autonomous vehicles may receive such notifications on a pre-determined frequency and the warning signal may initiate a braking action of the autonomous vehicle.

In some instances, a computer of a vehicle may be programmed with a height of a vehicle and may receive notifications from various communication platforms of a limited-height infrastructure object that is upcoming on a travel path. Such a vehicle may also transmit a probing signal which indicate the vehicle height to other devices. Navigation programs may track a travel path of the vehicle using a map, may recognize an upcoming roadway segment with a reduced-height area, and may initiate its own driver warning process. The present embodiments may be used in combination with these features and may constitute a verification arm of a "trust but verify" approach by validating stored data against real-world data. The present embodiments may encompass a two-pronged approach—with one prong being initiated from within the vehicle and the other prong being initiated by the smart infrastructure. The warning using the stored information alone may be considered a "recommendation" tool because the information might not always be up to date. The physical consequences of vehicle collision with infrastructure are drastic enough that a real-time measurement verification is needful to supplement such recommendation tool.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 shown in FIG. 4 contains an example of an environment for the execution of at least some of the computer code involved in performing the inventive methods, such as vehicle height sensing program 416. In addition to vehicle height sensing program 416, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and vehicle height sensing program, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in multilingual machine learning model pretraining 416 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in vehicle height sensing program 416 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing exceptionally large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415. The network module 415 includes the software, hardware, and firmware necessary for communication with 5G NR signals.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers. For the micro-cell implemented in the present embodiments, a 5G NR network communication in a micro-cell or micro-MEC is used for the functions of the vehicle height sensing program 416.

END USER DEVICE (EUD) 403 is any computer system that is used and controlled by an end user (for example, a customer of an enterprise that operates computer 401) and may take any of the forms discussed above in connection with computer 401. EUD 403 typically receives helpful and useful data from the operations of computer 401. For example, in a hypothetical case where computer 401 is designed to provide a natural language processing result to an end user, this result would typically be communicated from network module 415 of computer 401 through WAN 402 to EUD 403. In this way, EUD 403 can display, or otherwise present, the result to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments. In this regard, each block in the flowchart, pipeline, and/or block diagrams may represent a module, segment, or portion of instructions, which comprises one or more executable instructions for implementing the specified logical function(s).

What is claimed is:

1. A method for vehicle height sensing, the method comprising:
   receiving, via a 5G NR transceiver of a first computer fixed to a first stationary object, a first 5G NR signal transmitted from a second computer fixed to a second stationary object, wherein the first 5G NR signal indicates that a vehicle is approaching the 5G NR transceiver, and wherein the first computer is disposed at a first distance from the second computer, the first distance being 600 feet or greater;
   in response to receiving the first 5G NR signal, generating and transmitting via the first computer a second 5G NR signal;
   receiving, via the 5G NR transceiver, a third 5G NR signal in response to the transmitting of the second 5G NR signal, the third 5G NR signal having been sent from a position aligned with the second computer and the first distance;
   determining, via the first computer performing triangulation using the received third 5G NR signal, a height of the vehicle; and
   in response to the height exceeding a clearance distance of a stationary roadway structure associated with the first computer, generating and transmitting, via the first computer, a first response signal for altering a travel path of the vehicle.

2. The method of claim 1, wherein the first, second, and third 5G NR signals operate at a frequency range of 24 GHz to 300 GHz.

3. The method of claim 1, wherein the approaching vehicle is an autonomous vehicle comprising a human-machine interface; and
   wherein the first response signal comprises a 5G URLLC signal that is receivable via the human-machine interface of the autonomous vehicle.

4. The method of claim 3, wherein the first response signal is configured to cause the autonomous vehicle to perform a braking action.

5. The method of claim 3, wherein the 5G URLLC signal operates at a pre-determined frequency and the autonomous vehicle is programmed to search for signals at the pre-determined frequency.

6. The method of claim 1, wherein the first response signal is configured to cause an audio speaker associated with the approaching vehicle to audibly play a warning sound.

7. The method of claim 1, wherein the first stationary object is disposed at a distance away from the stationary roadway structure due to an obstruction in a section approaching the stationary roadway structure.

8. A computer system comprising:
a first computer and a second computer, the first computer comprising:
one or more processors,
one or more computer-readable tangible storage media,
a 5G NR transceiver, and
program instructions stored on at least one of the one or more computer-readable tangible storage media,
wherein the first computer is fixed to a first stationary object, the second computer is fixed to a second stationary object, the first computer is disposed at a first distance from the second computer, the first distance is 600 feet or greater, and the program instructions are for execution by at least one of the one or more processors to cause the first computer to:
receive via the 5G NR transceiver a first 5G NR signal indicative of a vehicle approaching the 5G NR transceiver, wherein the first 5G NR signal is from the second computer;
in response to receiving the first 5G NR signal, generate and transmit a second 5G NR signal;
receive via the 5G NR transceiver a third 5G NR signal in response to the transmitting of the second 5G NR signal, the third 5G NR signal having been sent from a position aligned with the second computer and the first distance;
determine, via performing triangulation using the received third 5G NR signal, a height of the vehicle; and
in response to the height exceeding a clearance distance of a stationary roadway structure associated with the computer system, generate and transmit a first response signal for altering a travel path of the approaching vehicle to avoid the stationary roadway structure.

9. The computer system of claim 8, wherein the first, second, and third 5G NR signals operate at a frequency range of 24 GHz to 300 GHz.

10. The computer system of claim 8, wherein the approaching vehicle is an autonomous vehicle comprising a human-machine interface; and
wherein the first response signal comprises a 5G URLLC signal that is receivable via the human-machine interface of the autonomous vehicle.

11. The computer system of claim 10, wherein the first response signal is configured to cause the autonomous vehicle to perform a braking action.

12. The computer system of claim 10, wherein the 5G URLLC signal operates at a pre-determined frequency and the autonomous vehicle is programmed to search for signals at the pre-determined frequency.

13. The computer system of claim 8, wherein the first response signal is configured to cause an audio speaker associated with the approaching vehicle to audibly play a warning sound.

* * * * *